(12) United States Patent
Kusutaki

(10) Patent No.: US 6,397,317 B1
(45) Date of Patent: May 28, 2002

(54) DATA PROCESSING METHOD AND APPARATUS HAVING ADDRESS CONVERSION

(75) Inventor: Izumi Kusutaki, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/385,759

(22) Filed: Aug. 30, 1999

(30) Foreign Application Priority Data

Sep. 4, 1998 (JP) .......................................... 10-251256

(51) Int. Cl.[7] .............................................. G06F 12/00
(52) U.S. Cl. ...................... 711/202; 711/102; 711/104
(58) Field of Search ................................ 711/102, 104, 711/202, 280, 170

(56) References Cited

U.S. PATENT DOCUMENTS 5,592,652 A * 1/1997 Hongo et al. ................ 711/170
5,829,012 A * 10/1998 Marlan et al. ............... 711/102

FOREIGN PATENT DOCUMENTS

| JP | 60-91460 | 5/1985 |
| JP | 6-223205 | 8/1994 |
| JP | 9-160824 | 6/1997 |

* cited by examiner

Primary Examiner—Matthew Kim
Assistant Examiner—B. R. Peugh
(74) Attorney, Agent, or Firm—Dike Bronstein, Roberts & Cushman IP Group Edwards & Angell, LLP; David G. Conlin; Timothy Carter Pledger

(57) ABSTRACT

A data processor comprising an adder for adding an address signal and an address conversion data set up by a central processing unit, to decide a converted address signal corresponding to the address signal, and a selector for selecting either of the converted address signal decided by the adder or the address signal, based on the detection signal output from an agreement detection circuit which judges whether the address signal agrees with the original ROM address or not, wherein the processings in the adder and the agreement detection circuit are performed in parallel.

6 Claims, 11 Drawing Sheets

DATA PROCESSING METHOD AND APPARATUS HAVING ADDRESS CONVERSION

BACKGROUND OF THE INVENTION

1. Field of the Invention

The present invention relates to a data processing method and an apparatus having address conversion, which makes it possible to transfer data stored in a memory accessing at low speed to a memory accessing at high speed to perform high-speed accessing.

2. Description of the Related Art

Recently, there is a demand for a system, for example a printer, which performs data processing at high speed. However, since a ROM (read-only memory) for storing programs accesses data at low speed, there is such a problem that even if a central processing unit (CPU) can be used at high speed, there is a latency, thus requiring long access time. Therefore, to solve this problem, there is known a technique to realize a system in which a program is loaded to a high-speed RAM (random access memory) such as static RAM, DRAM having functions of page mode and hyperpage mode and the like, and the RAM is accessed to perform a high-speed processing. As follows is a description of the related art.

Related Art 1

In Japanese Patent Application Laid-open No. Hei 9-160824, there is disclosed a data processor which reads out program data from a read-only memory such as ROM to perform the processing. This is to transfer program data stored in a ROM generally known as low-speed access to a RAM known as high-speed access, at the time of initialization, and to access the program data normally from the RAM at high speed.

FIG. 1 is a schematic structural diagram disclosed in Japanese Patent Application Laid-open No. Hei 9-160824.

In FIG. 1, when a start signal is input to a timing generator 804 at the time of initialization, an address for accessing a low-speed ROM 806 is generated by an address generator 805, using a timing produced by the timing generator 804.

The n-bit address output from the address generator 805 is input to the ROM 806 and also a multiplexor 802, and selected as an address output from an address generator 801 normally used, by a select signal slct output from the timing generator 804, and output from the multiplexor 802.

Therefore, at the time of initialization, the address from the address generator 805 is selected as an address for RAM 803, and m-bit data read out from the ROM 806 is written in the RAM 803.

On the other hand, at the normal situation, the address from the address generator 801 is selected, and the RAM 803 outputs program data based on the address. Hence, at the time of initialization, data from the low-speed ROM 806 is transferred to the RAM 803, and at the normal situation, data is accessed from the RAM 803.

Related Art 2

A technique for selecting an area in ROM and an area in RAM is disclosed in Japanese Patent Application Laid-open No. Hei 6-223205.

FIGS. 2 and 3 are schematic structural diagrams disclosed in Japanese Patent Application Laid-open No. Hei 6-223205.

In FIG. 2, two address setup registers 901 and 902 set up an address boundary between ROM (or SRAM) and DRAM in a memory map in FIG. 3, to set up [400000H] and [B00000H] (hexadecimal notation), respectively. With two comparator circuits 903 and 904, addresses input by the address setup registers 901 and 902 and address input via an address bus are compared in size, and it is recognized by a judgement circuit 905 that memory map have been divided into three address areas as shown in FIG. 3.

With three configuration registers (CR) 906, 907 and 908, it is configured that the three addresses are either for ROM (SRAM) or for DRAM. That is to say, a bit configuration is performed such that CR906 is ROM, CR907 is DRAM, and CR908 is ROM. With the output from the judgement circuit 905 and the value configured by these three registers, a selection circuit 909 then sends the information showing which memory area is ROM, and which memory area is DRAM to a control circuit 911.

When the address is in the area of DRAM in the control circuit 911, a control signal for the DRAM is generated, and the address is divided into a column address and a row address by the multiplexor 910 and is output.

On the other hand, when the address is in the area of ROM, a control signal for the ROM is generated from the control circuit 911, and the address is output directly.

Hence, which one of ROM and DRAM is used can be freely configured only by setting up the address setup registers 901 and 902, and the configuration registers 906, 907 and 908.

Moreover, with this technique, address conversion is also possible. For example, by setting up the configuration registers 906, 907 and 908, FIG. 3A can be converted to FIG. 3B, and it looks like the address is converted.

Related Art 3

As a technique for performing the address conversion, there is known a technique disclosed in Japanese Patent Application Laid-open No. Sho 60-91460.

FIG. 4 is a schematic structural diagram disclosed in Japanese Patent Application Laid-open No. Sho 60-91460.

In FIG. 4, an address output from a central processing unit (hereinafter referred to as "CPU") 1101 is transferred to an address detection circuit 1103, and when it agrees with a preset address, the agreement is informed to a gate circuit 1104.

Upon reception of the agreement information, the gate circuit 1104 opens the gate to output the data set in the offset register 1102.

The adder 1105 adds the data from the gate circuit 1104 and the address from the CPU 1101 and outputs the converted address.

When the address detection circuit 1103 judges that the address from the CPU 1101 does not agree with the preset address, the gate circuit 1104 does not open the gate and outputs "0". Thus, the adder 1105 will add the address from the CPU 1101 and "0", that is, the original address which has not been converted is output.

With Japanese Patent Application Laid-open No. Hei 9-160824 of the related art 1, since it is so set that read is always performed from RAM at the normal situation, the RAM capacity for storing the transferred ROM data is generally required in addition to the working RAM required for the system. Hence, it has such defects that the system cost increases, and that the ROM is required only at the time of initialization, thus it is not efficient in view of the system efficiency.

With Japanese Patent Application Laid-open No. Hei 6-223205 of the related art 2, the address for ROM (SRAM) and the multiplexed address for DRAM is changed over from the common address bus to simplify the outside circuit. To realize a high-speed access, however, recently it is normal to constitute the system such that the ROM address and the DRAM address are separately set to make it possible to access them at the same time. The related art 2 has a defect in that such a construction is not considered.

As an effect of the related art 2, the address is converted, for example, from FIG. 3A to FIG. 3B, by transferring the ROM data in the memory area from the address [000000H] to [3FFFFFH] to the DRAM area from [400000H] at the time of initialization, so that an access from the high-speed DRAM is made possible. In this case, however, the access which has directly addressed the DRAM area before the conversion becomes impossible. For example, in the case where it is programmed to write [500000H] before the conversion, it has such a problem that [500000H] after the conversion becomes ROM, thereby write of [500000H] is not possible.

With Japanese Patent Application Laid-open No. Sho 60-91460 of the related art 3, the address is monitored by the address detection circuit 1103, and when the address agrees with the predetermined address, the gate circuit 1104 is opened to add an offset value to the address. Hence, the time for agreement detection and the time for addition are required, which has a problem that a high-speed conversion is not possible.

SUMMARY OF THE INVENTION

With a view to solving the above-described problems, it is an object of the present invention to provide a data processing method and apparatus having address conversion which makes it possible to efficiently transfer data stored in a memory accessing at low speed to a memory accessing at high speed to perform high-speed accessing to the data.

Aspects of the present invention to attain the above-described object has a construction as described below.

A first aspect of the present invention is a data processing method having address conversion, which makes it possible to transfer data stored in a low-speed access memory to a high-speed access memory to perform high-speed accessing, comprising:

a memory selection step for selecting accessing to the data either from a low-speed access memory or a high-speed access memory;

a converted address decision step for deciding a converted address signal of an address signal, based on the address signal and an address conversion data set up by a central processing unit;

a comparison step for comparing the address signal and an original address in the low-speed access memory, and judging whether the address signal agrees with the original address or not; and an address signal selection step for selecting either one signal of the address signal and the converted address signal, based on the selection result in the memory selection step and the comparison result in the comparison step, wherein the same data can be accessed by either the low-speed access memory or the high-speed access memory.

A second aspect of the present invention is a data processing method having address conversion according to the first aspect, wherein the address signal used in the converted address decision step is characterized in that the entire bits of the signal are not set, but a plurality of predetermined bits are set.

A third aspect of the present invention is a data processing method having address conversion according to the first or second aspect, wherein the memory selection step is to select accessing, based on the capacity of a vacant area in the high-speed access memory, from the high-speed access memory if the capacity of the vacant area is sufficient for the data processing, and from the low-speed access memory if the capacity of the vacant area is not sufficient for the data processing.

A fourth aspect of the present invention is a data processing method having address conversion according to the first or second aspect, wherein the memory selection step is performed by reading a selection flag written in a nonvolatile memory.

A fifth aspect of the present invention is a data processing method having address conversion according to the third aspect, wherein the memory selection step is performed by reading a selection flag written in a nonvolatile memory.

A sixth aspect of the present invention is a data processor having address conversion, which makes it possible to transfer data stored in a low-speed access memory to a high-speed access memory to access the data at high speed, comprising:

an adder section for adding an address signal and an address conversion data set up by a central processing unit, to decide a converted address signal corresponding to the address signal;

a judgement section for judging whether the address signal agrees with an original address corresponding to the low-speed access memory which performed the data transfer; and a selection section for selecting the converted address signal decided by the adder section, based on a detection signal output from the judgement section, wherein the processings in the adder section and the judgement section are performed in parallel.

A seventh aspect of the present invention is a data processor having address conversion, which makes it possible to transfer data stored in a low-speed access memory to a high-speed access memory to access the data at high speed, comprising:

an adder section for adding an address signal and an address conversion data set up by a central processing unit, to decide a converted address signal corresponding to the address signal;

a judgement section for judging whether the address signal agrees with the original address corresponding to the low-speed access memory which performed the data transfer; and a selection section for selecting a signal of either the address signal or the converted address signal, based on the detection signal output from the judgement section and a selection data showing which one of the low-speed access memory and the high-speed access memory is used for accessing the data, wherein the processings in the adder section and the judgement section are performed in parallel.

An eighth aspect of the present invention is a data processor having address conversion according to the sixth or seventh aspect, wherein the address signal processed in the adder section is characterized in that the entire bits of the address data are not set, but a plurality of predetermined bits are set.

According to the invention of the first aspect, it is judged by the memory selection step whether the data can be processed in the high-speed access memory or not, based on the vacant area of the high-speed access memory and the like.

Moreover, to make it possible to access the converted address in the high-speed access memory based on the address signal, the converted address is first decided in the converted address decision step, based on the address signal and the address conversion data. The address signal and the original address in the low-speed access memory are then compared in the comparison step, to judge whether the address signal is the original address or not, and if there are a plurality of converted addresses, to which converted address the address signal corresponds.

If the address signal is judged to be the original address in the comparison step, and the judgement result in the memory selection step (that is, the judgement result whether the data can be accessed from the high-speed access memory) is positive, the corresponding converted address signal is selected in the address signal selection step, and the desired data is accessed from the high-speed access memory.

On the contrary, if at least one of the judgement result in the comparison step and the judgement result in the selection step is negative, not the converted address signal, but the address signal is selected in the address signal selection step, and the desired data is accessed from the original address in the low-speed access memory.

Since it can be selected, without changing the data contents in the original address, whether the data is accessed from the low-speed access memory or from the high-speed access memory, when the address conversion is not necessary, a new address conversion processing is not required, thereby contributing to the reduction of the processing time, the downsizing of the apparatus, and reduction of the program size.

According to the invention of the second aspect, as the address signal used in the converted address decision step, a plurality of predetermined bits required for the processing is used, based on the data to be transferred, hence rapid processing is performed, contributing reduction of the processing time and processing steps.

According to the third aspect of the present invention, at the time of accessing the data at high speed, accessing can be selected such that if the capacity of the high-speed access memory is not sufficient for the data processing, the data is accessed from the low-speed access memory, and if the capacity of the high-speed access memory is sufficient for the data processing, the data is accessed from the high-speed access memory. Hence, such a problem can be prevented that the system cannot operate normally by lack of the working area of the high-speed access memory.

According to the fourth and fifth aspects of the present invention, it is written in a nonvolatile memory whether the data in the low-speed access memory can be transferred to the high-speed access memory or not. Since the content in the nonvolatile memory is not erased even if the power is shut off, an user can automatically access to the high-speed access memory at the time of turning the power on or at the time of restarting, without knowing the capacity of the high-speed access memory, thereby enabling the high-speed processing.

According to the sixth aspect of the present invention, the address signal and the address conversion data are added by the adder section, to decide a converted address signal corresponding to the address signal, and in parallel, it is judged by the judgement section whether the address signal corresponds to (agrees with) the original address in the low-speed access memory which has been transferred to be processed in the high-speed access memory or not, and if there are a plurality of original addresses, which original address it is.

Then, in the selection section, the converted address signal is selected based on the detection signal output from the judgement section.

The processings in the adder section and the judgement section are performed in parallel, hence the time for deciding a desired address signal can be shortened, thereby contributing to high-speed data processing.

According to the seventh aspect of the present invention, the address signal and the address conversion data are added by the adder section, to decide a converted address signal corresponding to the address signal, and in parallel, it is judged by the judgement section whether the address signal corresponds to (agrees with) the original address in the low-speed access memory which has been transferred to be processed in the high-speed access memory or not, and if there are a plurality of original addresses, which original address it is.

If it is judged by the judgement section that the address signal is the original address, the corresponding converted address signal is selected in the selection section, to access the desired data from the high-speed access memory.

On the contrary, if it is judged by the judgement section that the address signal is not the original address, not the converted address signal, but the address signal is selected in the selection section, to access the desired data from the original address in the low-speed access memory.

Hence, such a problem can be prevented that the system cannot operate normally by lack of the working area of the high-speed access memory.

The processing in the adder section and the judgement section are performed in parallel, hence the time for deciding a desired address signal can be shortened, contributing to high-speed data processing. Moreover, it can be selected whether the data is accessed from the low-speed access memory or from the high-speed access memory, without changing the data contents in the original address. Hence, even if it is required to access the data from the low-speed access memory, complicated address processing such as reconverting the data which has been subjected to the address conversion is not required, thereby contributing reduction of the processing time, downsizing of the apparatus, and reduction of the program size.

According to the eighth aspect of the present invention, by setting a plurality of predetermined bits, not setting the entire bits of the address data, the address signal used in the adder uses the plurality of predetermined bits required for the processing, based on the data to be transferred, hence rapid processing is performed, contributing reduction of the processing time and downsizing of the apparatus.

DESCRIPTION OF THE PREFERRED EMBODIMENTS

As follows is a description of embodiments of the present invention with reference to the accompanying drawings.

Figure 1:
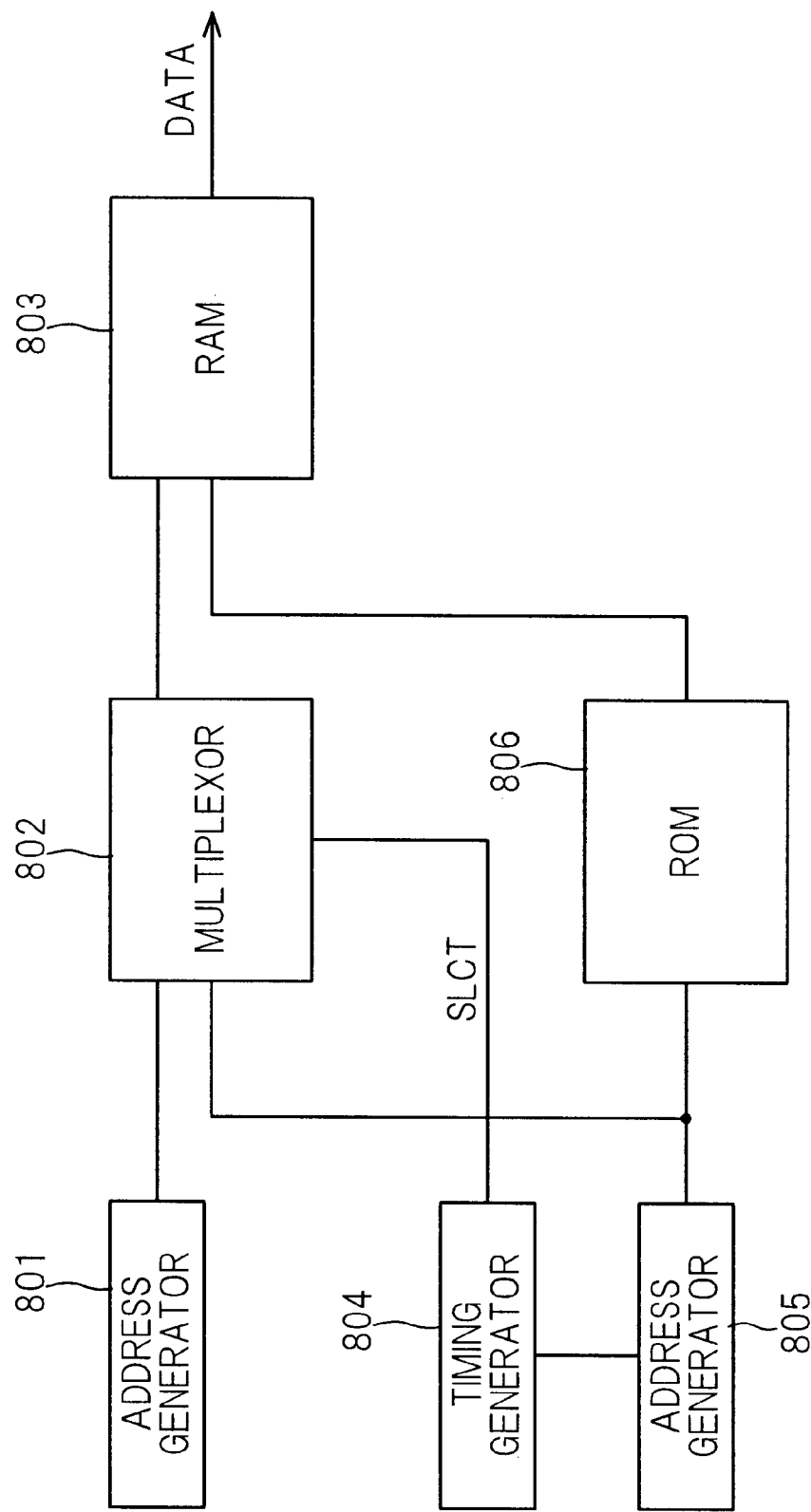
FIG. 1 is a block diagram showing a schematic structure of the related art 1.
Figure 2:
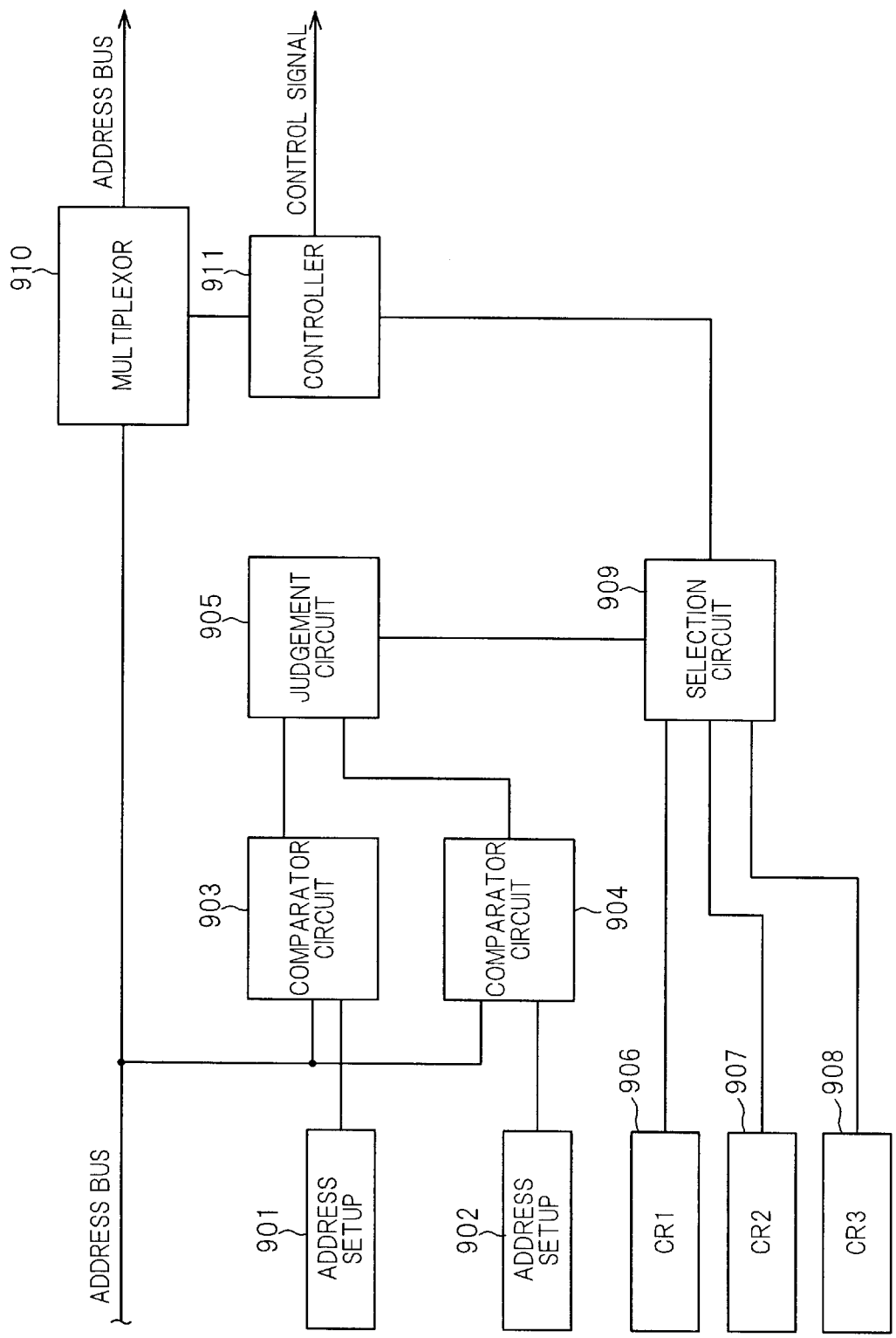
FIG. 2 is a block diagram showing a schematic structure of the related art 2.
Figure 3B:
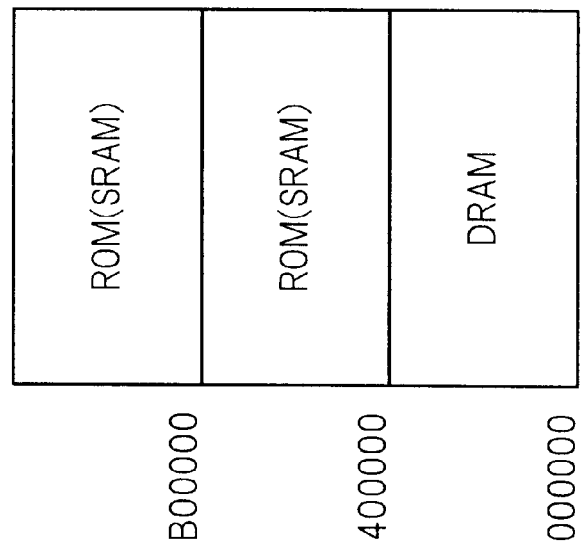
FIG. 3B is a diagram illustrating a memory map after the address conversion in the related art 2.
Figure 3A:
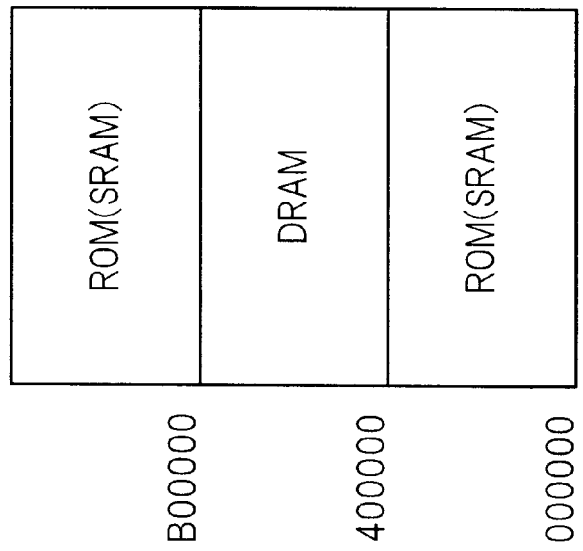
FIG. 3A is a diagram illustrating a memory map before the address conversion in the related art 2.
Figure 4:
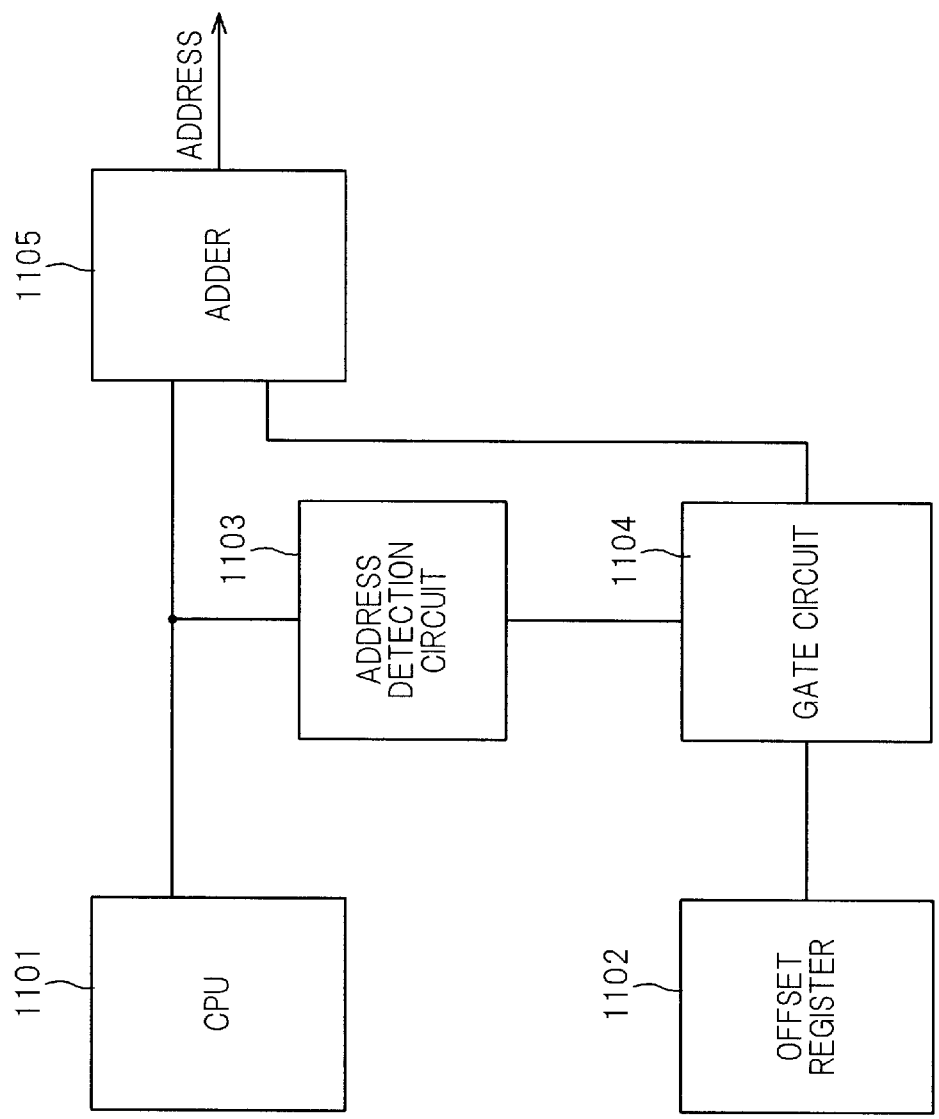
FIG. 4 is a block diagram showing a schematic structure of the related art 3.
Figure 5:
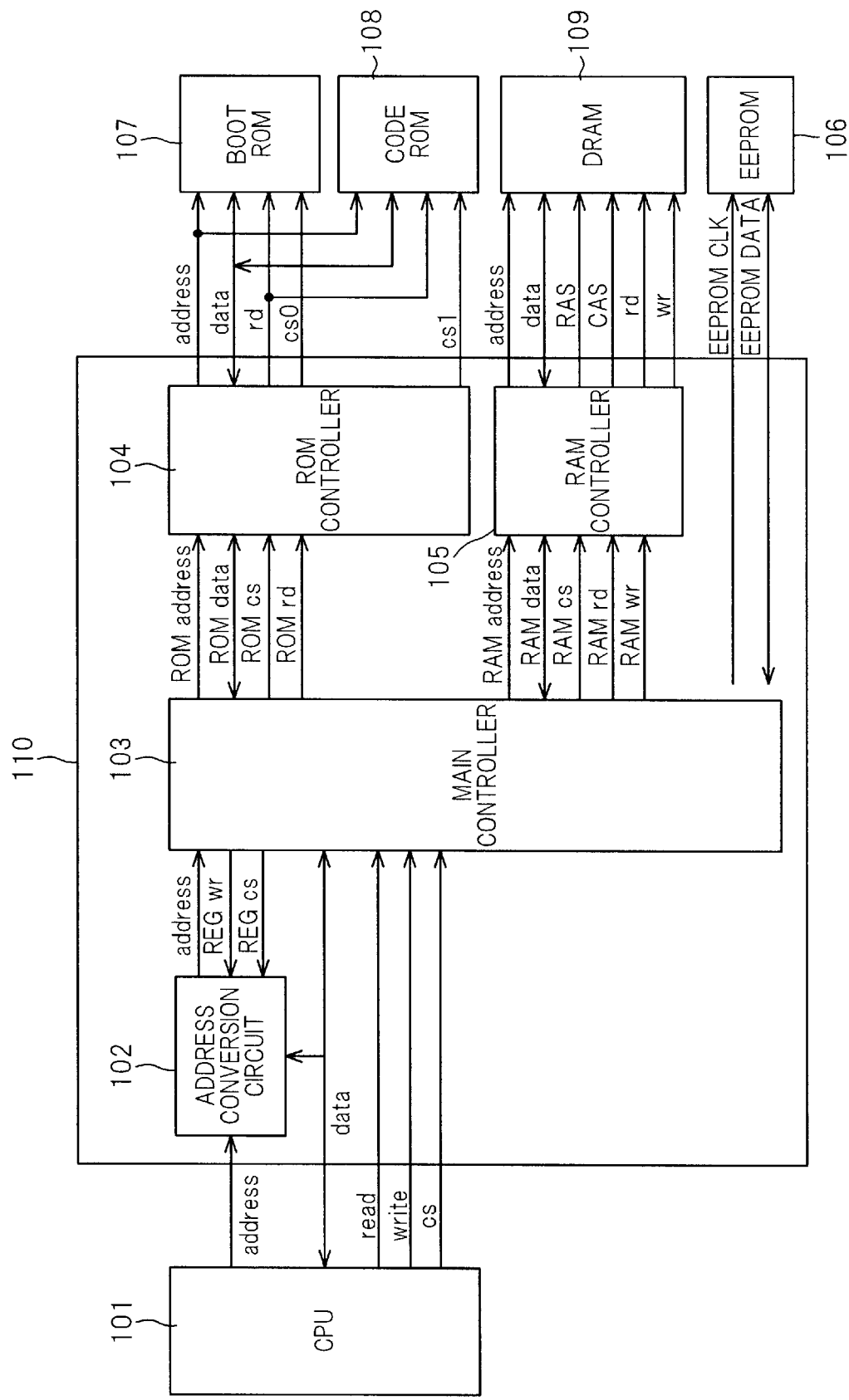
FIG. 5 is a block diagram showing a schematic structure of a data processor according to an embodiment of the present invention.

FIG. 5 shows a schematic block diagram of a data processor having address conversion, comprising a central processing unit (hereinafter referred to as "CPU") 101 for outputting control commands such as address signals, read command and the like, an address conversion circuit 102 for enabling conversion of the address signal, a main controller 103 for performing data processing with each apparatus and the like, a ROM controller 104 for controlling various memories described later based on the data from the main controller 103, a RAM controller 105, a BOOT ROM 107 and a CODE ROM 108 connected to the ROM controller 104, a DRAM 109 connected to the RAM controller 105, and an EEPROM memory connected to the main controller 103.

In FIG. 5, in the case of the ROM access, an address signal "address" output from the CPU 101 is first input to the address conversion circuit 102. If the initial stage is so set that the address conversion is not performed by the address conversion circuit 102, the address conversion circuit 102 outputs the input address signal "address" directly to the main controller 103 without address conversion.

With the main controller 103, the input address signal "address" is decoded by a decoder circuit (not shown) inside the main controller 103. If the input address signal "address" corresponds to the BOOT ROM and CODE ROM areas in a memory map shown in FIG. 6A, the main controller 103 outputs the address signal "address" to the ROM controller 104. If the input address signal "address" corresponds to the RAM area, the main controller 103 outputs the address signal "address" to the RAM controller 105. At this time, the main controller 103 generates ROM "rd" (read), ROM "cs" (chip select), RAM "rd", RAM "wr" (write) and RAM "cs" signals for outputting them to the ROM controller 104 and the RAM controller 105, based on a read signal "read", a write signal "write" and a device select signal "cs" from the CPU 101. The above "cs" signal is used as an access sync signal, and "rd" and "wr" signals are to judge whether the signal is "read" or "write".

The ROM controller 104 generates signals "address", "rd" and "cs" for accessing the externally attached BOOT ROM 107 and CODE ROM 108, based on the address signal "address", ROM "rd" and ROM "cs" signals from the main controller 103.

Moreover, the RAM controller 105 generates signals "address", "RAS", "CAS", "wr" and "rd" for accessing the externally attached DRAM 109, based on the address signal "address", RAM "rd", RAM "wr" and RAM "cs" signals from the main controller 103.

The data read by the CPU 101 is processed as described below.

The data read from the BOOT ROM 107 and the CODE ROM 108 are first sent out to the ROM controller 104, and on the other hand, the data read from the DRAM 109 is sent to the RAM controller 105.

The data in the ROM controller 104 and the RAM controller 105 are then sent out to the main controller 103, then sent out to the CPU 101 as the data for the CPU 101, through an inside bus adjusting circuit (not shown).

Normally, a program data for operating the CPU is stored in the ROM, and working data such as stack for operating the program is stored in the RAM.

Furthermore, when the data from the CPU is written in the memory, the data is sent out through the main controller 103 and the RAM controller 105 to the DRAM 109 and written therein.

When the program data in the ROM 108 is accessed from the RAM, the program data in the CODE ROM 108 is first read by the CPU 101 and written in the DRAM 109.

By performing the above-described processing, a memory map shown in FIG. 6B which has undergone the address conversion is obtained from the memory map shown in FIG. 6A. That is to say, the CODE ROM area from the address [100000H] is transferred to the RAM area in the address [400000H]. Here, the CPU 101 sets up a register for the original address (in the case of this embodiment, [100000H]), a register for the converted address (in the case of this embodiment, [400000H]), and a register for enabling the address conversion, in the address conversion circuit 102. After this setup, when the CODE ROM area (from address [10000H]) is accessed from the CPU 101, the address is converted by the address conversion circuit 102. The main controller 103 judges this converted address corresponds to the RAM area, since it is an address from [400000H], and the address is sent to the RAM controller 105 to access the DRAM 109. Hence, the transferred program data in the CODE ROM in the RAM area is used as the DRAM access so as to be accessed by the CPU 101 at high speed. From the above description, judgement which one of the ROM access (that is, a low-speed access) and the RAM access (that is, a high-speed access) is used can be set by whether the address conversion is enabled or not to the address conversion circuit 102. Thereby, for example, in the case where the capacity of the RAM is small and there is no area to transfer the data, or in the case where the working memory is not sufficient, and the performance is poor, it can be selected to access the ROM without accessing the RAM, and on the contrary, in the case of a system having large capacity in the RAM, it can be selected to access the RAM.

Figure 6:
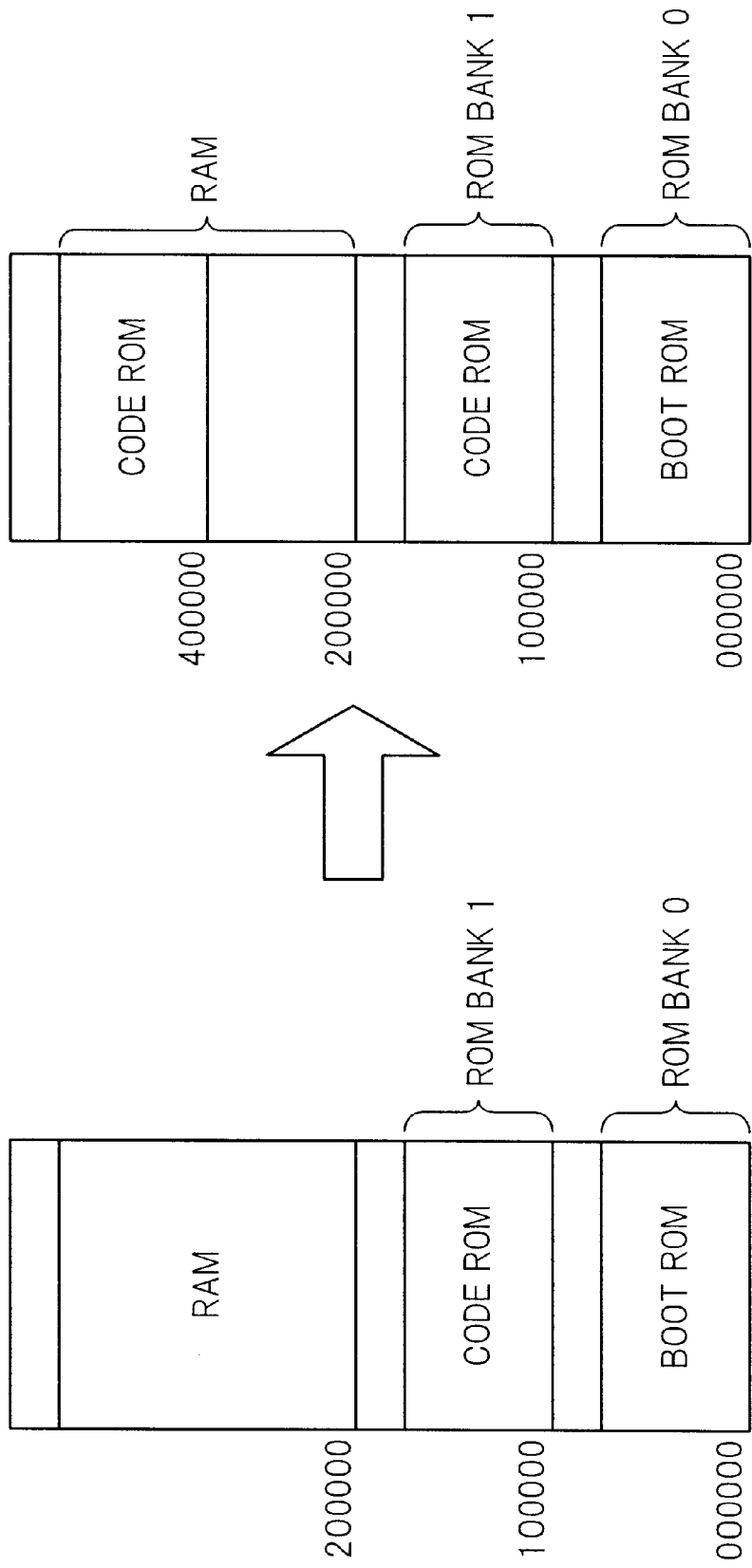
FIG. 6A is a diagram illustrating a memory map before the address conversion and FIG. 6B is a diagram illustrating a memory map after the address conversion, of the data processor according to an embodiment of the present invention.

In the above description, when the ROM area in the original address set up in the address conversion circuit 102 is pre-divided as a bank, for example, in a system which can set the BOOT ROM area as ROM bank 0, and the CODE ROM area as ROM bank 1, in the memory map of FIG. 6, a register for setting the original address is not required, and only a register for setting the converted address can perform the similar processing. Specifically, by providing a converted address setup register corresponding to ROM bank 0 as a register A, and a converted address setup register corresponding to ROM bank 1 as a register B, an original address setup register is not required, and the converted address setup register can perform the processing alone.

In the above-described system which can set a bank in the ROM area, since the ROM contains mainly a program data, the capacity is large. Therefore, dividing the converted address into small units is not useful. For example, if the converted address can be set by the entire bit, it can be converted in a unit of byte, but the program data in the ROM cannot be kept in 1 byte. If the unit of the program data in the ROM can be kept in 64 KB, the program data has only to be converted in a unit of 64 KB. Therefore, the lower 16 bits in the start address in the ROM bank can be fixed as [0000H]. Therefore, the lower 16 bits in the address does not have to be converted, and the address can be used as it is. Thus, the address setup for the converted address can be processed only by the upper 8 bits, hence the circuit size can be reduced.

Moreover, with the system which can set a bank in the ROM, if the setup register for enabling the address conversion is so set that, for example, in the memory map of FIG. 6, the ROM bank 0 in the BOOT ROM corresponds to the first bit, and the ROM bank 1 in the CODE ROM corresponds to the second bit, and if the first bit is "0", the address conversion of the BOOT ROM can be set as disable, and if the second bit is "1", address conversion of the CODE ROM can be set as enable.

Figure 7:
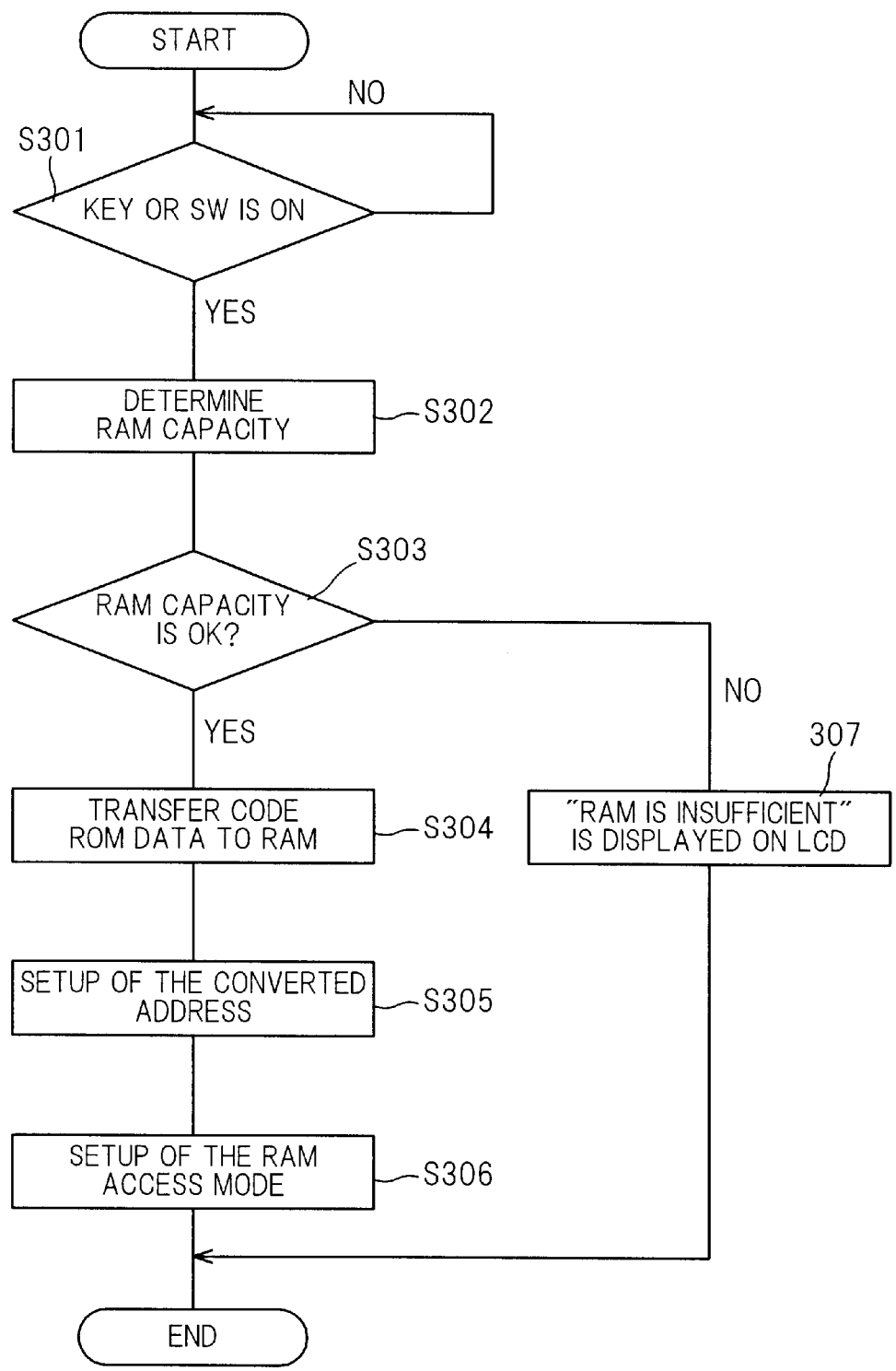
FIG. 7 is a flow chart of a data processor which informs an user that there is no vacant capacity in RAM.

Furthermore, selection for transferring the data in the CODE ROM to the RAM to perform the high-speed accessing (for example, setup of the second bit as "1") can be performed by an external input means, such as key input, switching input of a switch SW, or the like (not shown). A flow chart for selecting the high-speed access will now be described with reference to FIG. 7.

First check the key input (ON) or input (ON) of switch SW which is the above-described external input means (step S301), then determine the capacity of RAM to which the data is transferred, by a predetermined processing, (step S302), and judge whether there is sufficient vacant area or not based on the determination result (step S303).

If the capacity of RAM is not sufficient, it is displayed that the capacity of RAM is not sufficient by a display section, for example, display of "RAM is insufficient" on LCD (liquid crystal display), turning on a light of an insufficient vacant area display lamp, or the like (step S307).

If the vacant area in the RAM capacity is larger than the ROM area to be transferred, the data in the CODE ROM is transferred to the RAM (step S304), the address to be converted in the RAM from the CODE ROM area is set up in the address conversion circuit 102 (step S305), to turn into the high-speed access mode by the RAM (step S306), and the process is terminated.

A specific method for judging the vacant area in the RAM capacity is not described here, but there is a method for judging the capacity by writing data in a predetermined address, reading the same address to compare if it is the same as the written data or not, and if it is the same, by performing the next addressing (or repeating the process for the next address).

Figure 8:
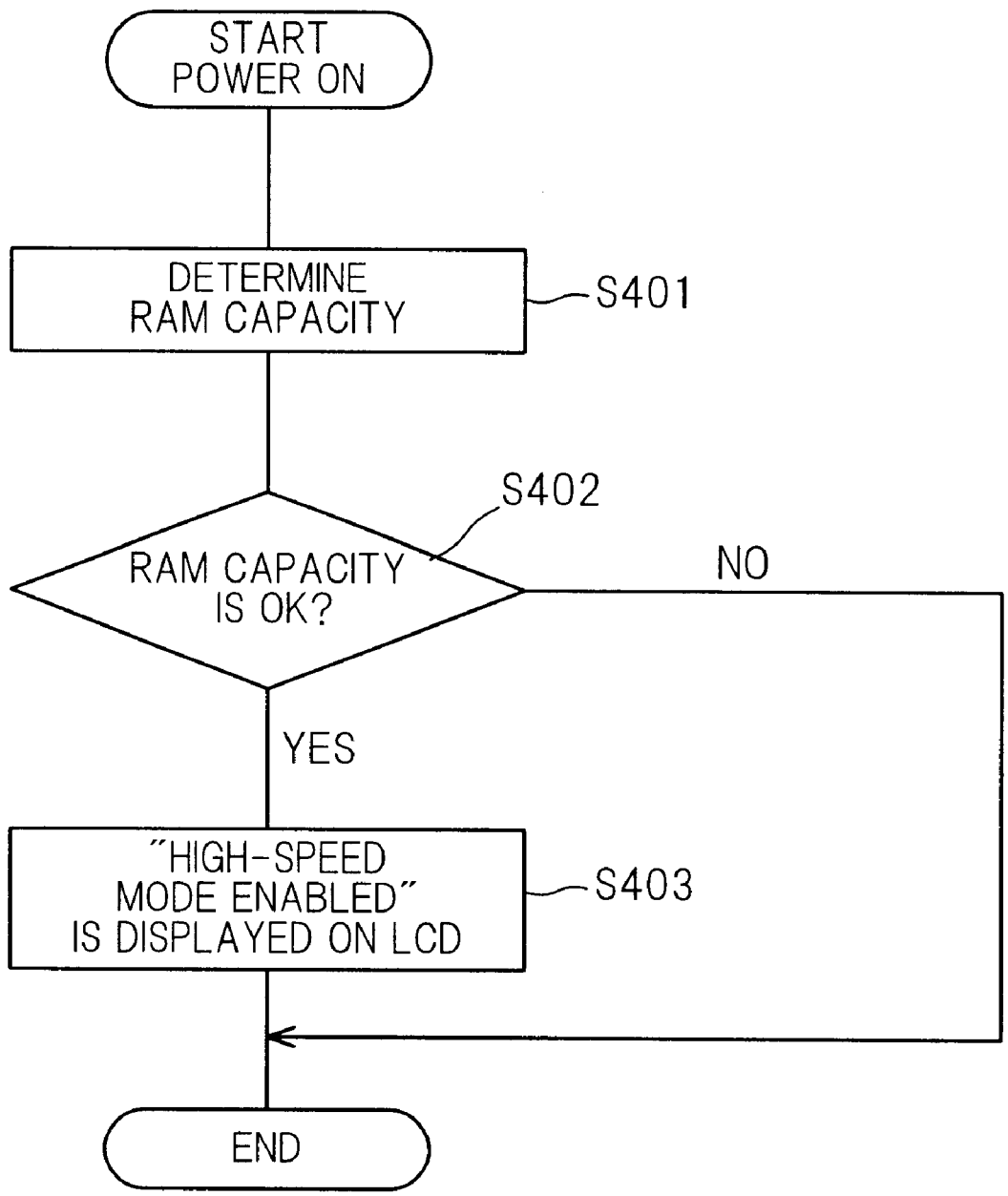
FIG. 8 is a flow chart of a data processor which informs an user that high-speed accessing is possible at the time of initialization.

Moreover, as shown in a flow chart in FIG. 8, the Capacity of RAM is determined and judged at the time of turning on the power (steps S401 and S402), and if there is enough capacity for performing the high-speed access, it may be displayed on LCD or the like that the high-speed access is possible (step S403).

Figure 9:
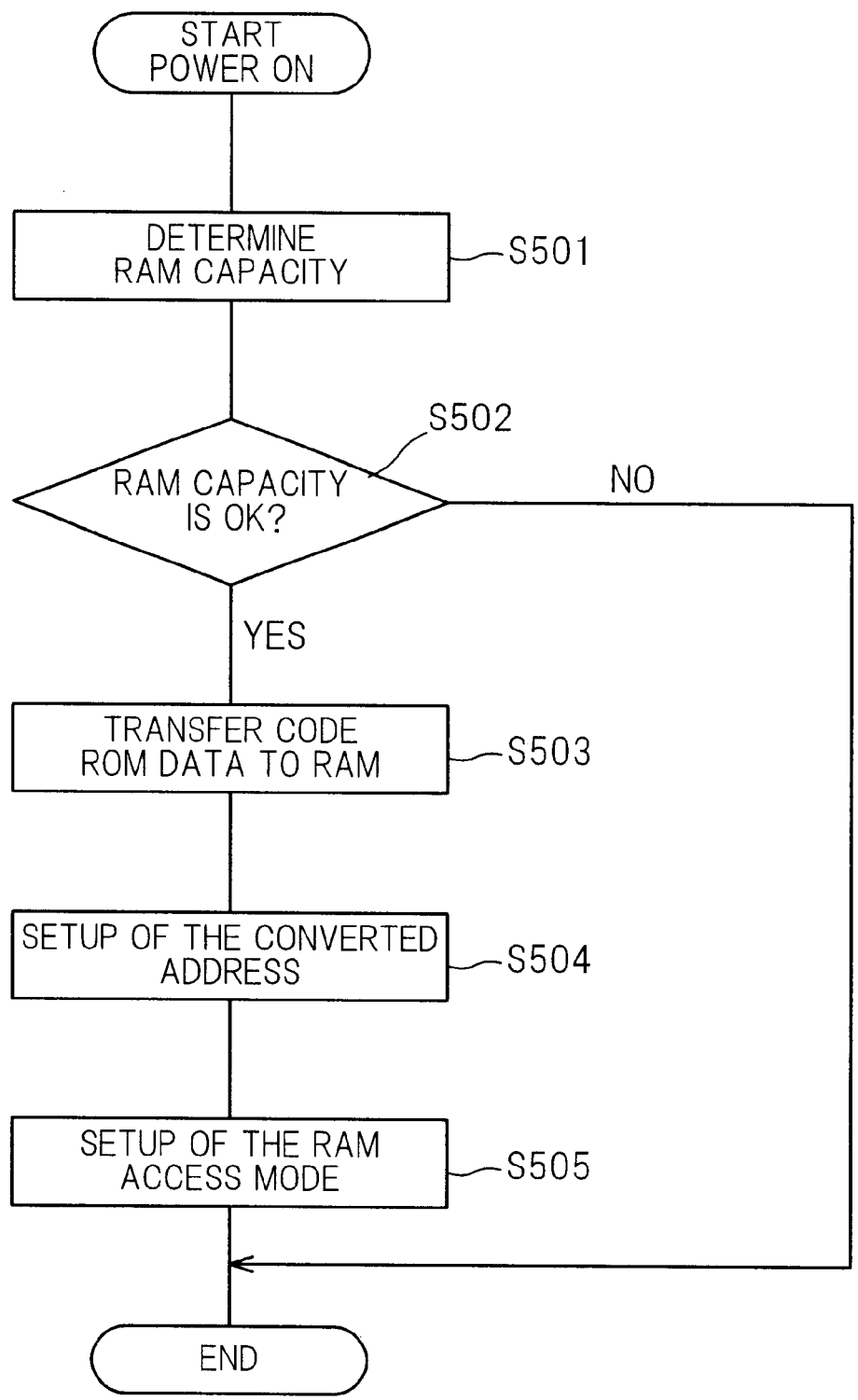
FIG. 9 is a flow chart of a data processor which accesses the data at high speed, if there is vacant capacity in RAM at the time of initialization.

As shown in a flow chart in FIG. 9, the capacity of RAM is determined and judged at the time of turning on the power (steps S501 and S502), and if there is enough capacity for performing the high-speed access, the data in the CODE ROM is automatically transferred to the RAM (step S503), and by setting up the converted RAM address to which the data in the CODE ROM has been transferred in the address conversion circuit 102 (step S504) to set up the RAM access mode (step S505), RAM accessing is also made possible.

If there is not enough capacity for performing the high-speed access, ROM accessing is performed.

Hence, an user can always perform processing with the high-speed system without knowing the capacity of RAM of the system, and such a problem can be prevented that the system cannot operate normally by lack of the work RAM.

Furthermore, if it is stored in a nonvolatile RAM such as EEPROM or the like that RAM accessing is set, at the time of turning on the power next time, RAM access can be automatically performed by reading the data in the EEPROM. The 2-bit serial EEPROM consists of a sync clock signal CLK and a bi-directional serial data DATA, as shown in FIG. 5, and reads/writes the data by writing the command. That is to say, in the case of write, it transfers the write command serially, then transfers the address, and the write data. In the case of read, when it transfers the read command, and transfers the address, it reads the data synchronously with CLK.

Figure 10:
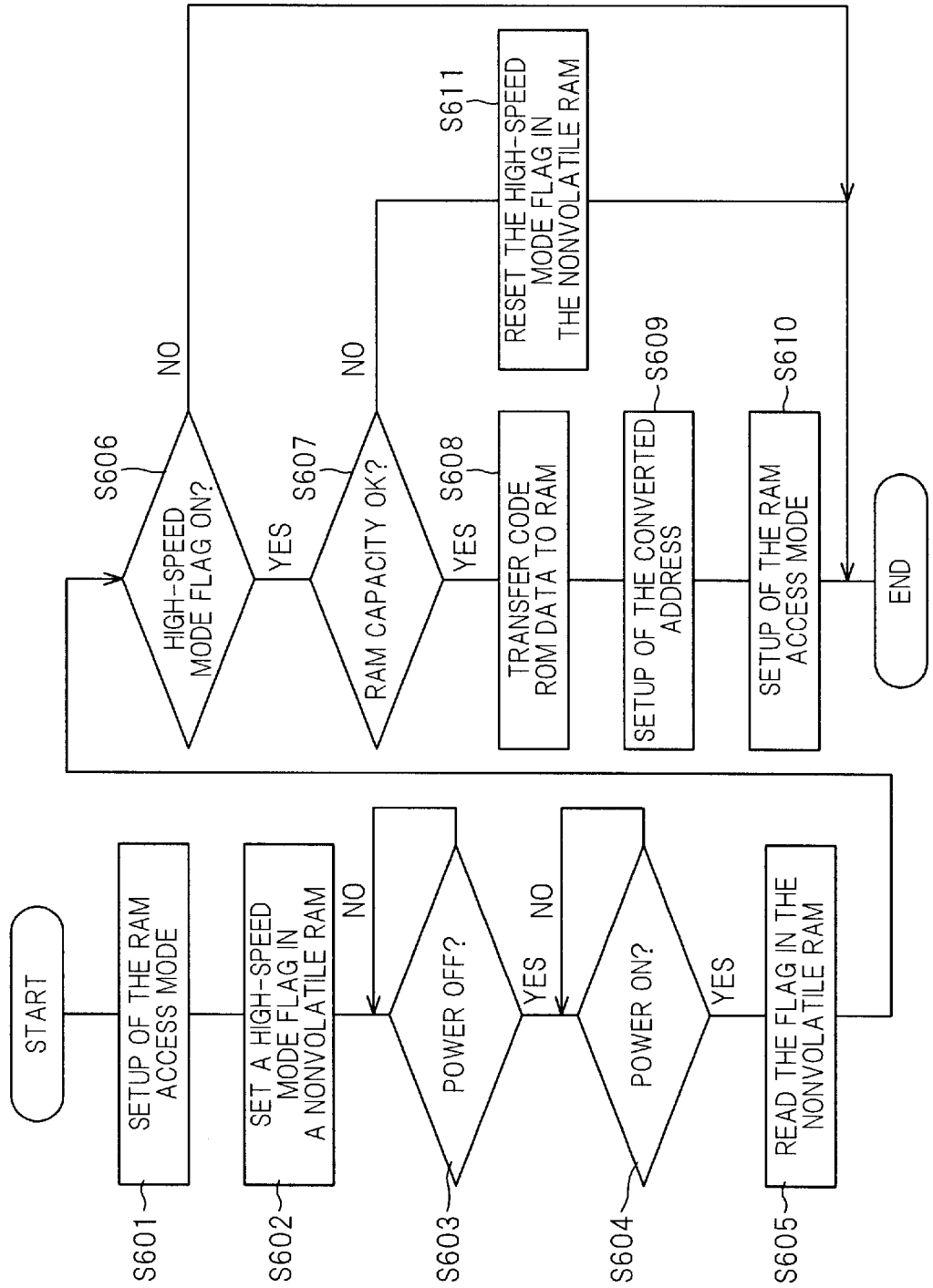
FIG. 10 is a flow chart of a data processor which judges whether high-speed accessing or low-speed accessing is used, using a nonvolatile RAM.

Next is a more detailed description with reference to the flow chart of the processing shown in FIG. 10. In the above-described RAM access mode (step S601), if the high-speed mode flag is set and stored in the nonvolatile RAM (step S602), and at the time of turning on the power next time (steps S603 and S604), the high-speed mode flag in the nonvolatile RAM is read (step S605), and the flag showing the high-speed mode is set up (step S606), the capacity of RAM is judged to change over to the RAM access mode (step S607).

If the capacity of RAM is less than the capacity sufficient for the data processing, the ROM accessing is used, and a flag showing the ROM access mode is set in the EEPROM, which is a nonvolatile RAM (step S611). If the vacant area in the RAM capacity is sufficient for the data processing, similar processing as in steps from S502 through S505 shown in FIG. 9 is performed (from steps S608 through S610).

By the processing in the flow chart shown in FIG. 10, for example, the RAM capacity is reduced during the power OFF, and such a problem can be prevented that the system cannot operate normally, even if there is insufficient work RAM.

Figure 11:
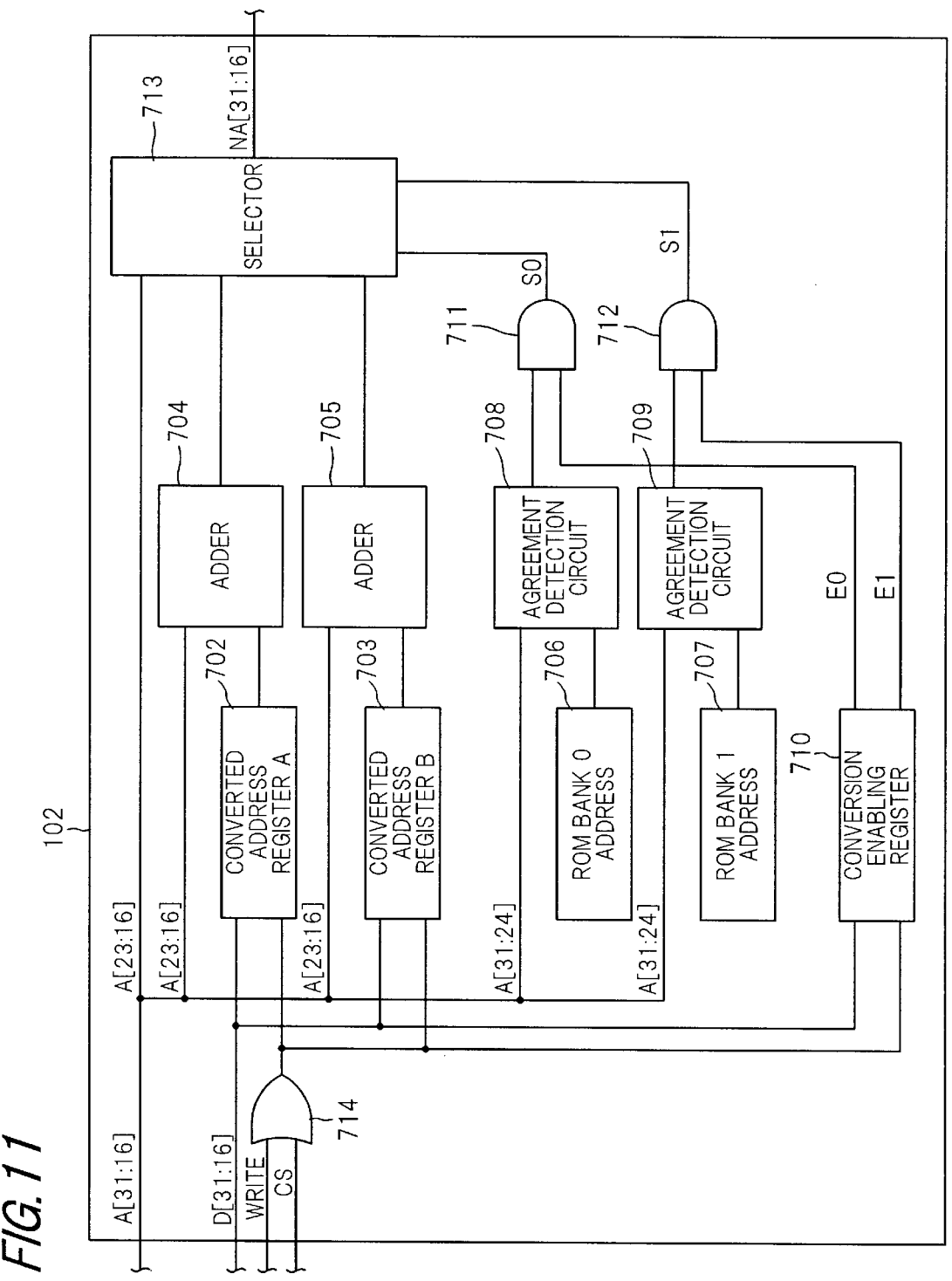
FIG. 11 is a block diagram showing a schematic structure of an address conversion circuit 102 in FIG. 5.

Next is a description of the address conversion circuit 102 with reference to FIG. 11. In this embodiment, it will be described as a system having 32-bit address.

Among addresses A[31:0] output from the CPU 101 in FIG. 5, the upper 16 bits of the address A[31:16] is input in the address conversion circuit 102. However, this is a case where the minimum unit in the capacity of ROM is decided as 64 KB, but the present invention is not limited thereto, and in other systems, for example, the minimum unit in the capacity of ROM is 128 KB, the break will be at the 17th bit.

The address A[23:16] of the lower 8 bits in the input upper 16 bits is input to two adders 704 and 705, and added, respectively, to the data in the registers 702 and 703 for the converted addresses.

In the above converted address registers 702 and 703, data D[31:16] from the CPU 101 (FIG. 5) is based on an output signal of the OR gate 714 for the negative AND of the WRITE signal and the CS signal from the CPU 101.

The output results of the adders 704 and 705 become the converted address. For example, if the input address A[31:16] is [0000 0000 1000 0011], and the converted address is [1100 0000 0000 0011], [1000 0011] in the A[23:16] and [1100 0000 00000011] are added in the adder, and the obtained result [1100 0000 1000 0110] will be the converted address. The adders 704 and 705 performs addition, irrespective of the access area being ROM or RAM, and outputs the converted address.

On the other hand, the address A[31:24] of the uppermost 8 bits of the input address is used for judging if the original address is in the area of the ROM bank or not. The upper 8 bits of the start address of ROM bank 0 is stored in the register 706, and this address data and the address A[31:24] are compared to judge if they agree or not by an agreement detection circuit 708. If they agree, an agreement signal is output. Likewise, detection of the address in ROM bank 1 becomes possible by an agreement detection circuit 709 which compares the address data in the address register 707 storing the upper 8 bits in the start address of the ROM bank 1 and the address A[31:24].

That is to say, by the detection of the agreement detection circuits 708 and 709, it is judged that which ROM bank the input address is, making it possible to decide the range of the address to be converted. Incidentally, the upper 8 bit is the case where one bank size is designated as 16 MB.

Furthermore, data D[31:16] from the CPU 101 (FIG. 5) is also set in the conversion enabling register 710, as the above-described converted address registers 702 and 703, based on an output signal of the OR gate 714 for the negative AND of the WRITE signal and the CS signal from the CPU 101.

When the bit value corresponding to the ROM bank in the conversion enabling register 710 is "1", it shows that the conversion of the ROM bank is enabled. With this embodiment, when the ROM bank 0 is designated as the first bit, and the ROM bank 1 is designated as the second bit, and if the value in the conversion enabling register 710 is "0000 0001", the address conversion of the ROM bank 0 is enabled, and the address conversion of the ROM bank 1 is disabled. When the enable/disable signals E0 and E1 for each ROM bank are input to the corresponding AND gates 711 and 712, respectively, they are added up by the output signal from the agreement detection circuits 708 and 709 which are the agreement signals of respective ROM banks as the AND processing (logical product), and the results are output to a selector 713 as signals S0 and S1.

That is to say, only when the address agrees with the address in the ROM bank 0, and the address conversion is enabled, S0 becomes active "1", and only when the address agrees with the address in the ROM bank 1, and the address conversion is enabled, S1 becomes active "1".

With the selector 713, any one of three addresses is selected from signals S0 and S1 corresponding to each ROM bank. The three addresses are (1) the original address A[23:16] output from the CPU 101, (2) the address converted by the adder 704, and (3) the address converted by the adder 705.

It is so defined that when (S0, S1)=(0, 0), (1) is selected, when (S0, S1)=(1, 0), (2) is selected, and when (S0, S1)=(0, 1), (3) is selected.

Hence, when there is an address in the area of the ROM bank 0, and the address conversion is enabled, the address is converted to an address set in the converted address register 702 and output. When there is an address in the area of the ROM bank 1, and the address conversion is enabled, the address is converted to an address set in the converted address register 703 and output.

On the other hand, when there is no address in the ROM bank 0 or 1, or the address conversion is disabled, the address A[23:16] which is not converted is output.

As described above, according to the image processor of this embodiment, accessing can be selected such that when the program data is transferred to the RAM to perform the high-speed processing, when the capacity of RAM is not sufficient, access is performed from ROM, and when the capacity of RAM is sufficient, access is performed from RAM, hence, such a problem can be prevented that the system cannot operate normally by lack of the work RAM.

Moreover, the contents of the initial program data are not changed to transfer the program data to a vacant area in the RAM. Hence, complicated calculation of the data storage address before and after the address conversion is not required as in the conventional case, making it possible to improve the processing efficiency.

Moreover in a system in which the address space in a ROM having program data is divided by bank allocation, and the minimum capacity of the ROM is pre-decided, the bit data required for the processing can be reduced, making it possible to reduce the circuit size.

When there are a plurality of areas which require the address conversion, it can be set whether the address conversion is to be performed or not for each area, to thereby improve the generalizability of the system design.

Since the processing in the adders 704 and 705, and in the agreement detection circuits 708 and 709 are performed in parallel, timing delay due to the address conversion is not caused, enabling high-speed accessing without changing the program data.

As described above, according to the invention of the first aspect, if the address signal is judged to be the original address in the comparison step, and the judgement result in the memory selection step is positive, accessing from the high-speed access memory becomes possible. On the contrary, either one of the judgement result in the comparison step and the judgement result in the selection step is negative, not the converted address signal but the original address signal is selected, to enable accessing from the low-speed access memory. At this time, since the original address is not changed, the data is not subjected to complicated address processing such as new address change or the like, depending upon the high-speed access memory or the low-speed access memory, enabling reduction of the processing time, reduction of the apparatus size and reduction of the program size.

According to the invention of the second aspect, the address signal used in the converted address decision step is judged by using a plurality of predetermined bits required for the processing, based on the data to be transferred, to thereby reduce the processing time, enabling rapid processing.

According to the invention of the third aspect, at the time of accessing the data at high speed, accessing can be selected such that if the capacity of the high-speed access memory is not sufficient, the data is accessed from the low-speed access memory, and if the capacity of the high-speed access memory is sufficient, the data is accessed from the high-speed access memory. Hence, such a problem can be prevented that the system cannot operate normally by lack of the working area.

According to the invention of the fourth and fifth aspect, by reading a predetermined flag in a nonvolatile memory at the time of turning the power on next time, an user can automatically perform the high-speed processing, without knowing the capacity of the high-speed access memory. Hence, the processing step requiring a longer time compared to the processing time of the data processor, such as judgement by the user, can be automated, thereby enabling the smooth processing.

According to the invention of the sixth aspect, the address signal and the address conversion data are added by the adder section, to decide a converted address signal corresponding to the address signal, and it is judged by the judgement section whether the address signal agrees with the corresponding original address or not, then the converted address signal is selected in the selection section, based on the detection signal output from the judgement section. By performing the processing in the adder section and the judgement section in parallel, the timing delay due to the address conversion can be reduced.

According to the invention of the seventh aspect, in addition to the effect of the aspect 6, accessing to the data can be selected either from the low-speed access memory or from the high-speed access memory, without changing the data contents in the original address, hence complicated address processing is not required, depending upon the high-speed access memory or the low-speed access memory. Moreover, even if the system does not operate normally by lack of the work area in the high-speed access memory, complicated address processing is not required.

According to the invention of the eighth aspect, by setting a plurality of predetermined bits, not setting the entire bits of the address data, as the address signal used in the converted address decision step, the plurality of predetermined bits required for the processing are used based on the data to be transferred, enabling high-speed processing.

What is claimed is:

1. A data processing method having address conversion, which makes it possible to transfer data stored in a low-speed access memory to a high-speed access memory to perform high-speed accessing, comprising:
a memory selection step for selecting accessing to said data either from a low-speed access memory or a high-speed access memory;
an arithmetic operation step for deciding a converted address signal of an address signal, by performing an arithmetic operation using the address signal and an address conversion data set up by a central processing unit;
a comparison step for comparing the address signal and an original address in the low-speed access memory, and judging whether the address signal agrees with the original address or not; and
an address signal selection step selected from the group consisting of
a first selection step in which, when the high-speed access memory is selected in the memory selection step and a judgment result in the comparison step is an agreement, the converted address signal is selected,
a second selection step in which, when the high-speed access memory is selected in the memory selection step and a judgment result in the comparison step is a disagreement, the address signal is selected,
a third selection step in which, when the low-speed access memory is selected in the memory selection step and a judgment result in the comparison step is an agreement, the address signal is selected, and
a fourth selection step in which, when the low-speed access memory is selected in the memory selection step and a judgment result in the comparison step is a disagreement, the address signal is selected,
wherein the memory selection step is to select accessing, based on the capacity of a vacant area in the high-speed access memory, from the high-speed access memory if the capacity of said vacant area is sufficient for the data processing, and from the low-speed access memory if the capacity of said vacant area is not sufficient for the data processing, and
wherein the same data can be accessed by either the low-speed access memory or the high-speed access memory.

2. The data processing method having address conversion according to claim 1, wherein the address signal used in the arithmetic operation step is characterized in that the entire bits of the signal are not set, but a plurality of predetermined bits are set.

3. The data processing method having address conversion according to claim 1 or 2, wherein the memory selection step is performed by reading a selection flag written in a non-volatile memory.

4. A data processor having address conversion, which makes it possible to transfer data stored in a low-speed access memory to a high-speed access memory to access said data at high speed, comprising:
an arithmetic operation section for performing an arithmetic operation using an address signal and an address conversion data set up by a central processing unit, to decide a converted address signal corresponding to the address signal;
a judgment section for judging whether the address signal agrees with an original address corresponding to the low-speed access memory which performed the data transfer; and
a selection section selected from the group consisting of
a first selection section in which, when a judgment result in the judgment section is an agreement, the converted address signal is selected, and
a second selection section in which, when a judgment result in the judgment section is a disagreement, the address signal is selected,
wherein the processings in said arithmetic operation section and said judgment section are performed in parallel.

5. A data processor having address conversion, which makes it possible to transfer data stored in a low-speed access memory to a high-speed access memory to access said data at high speed, comprising:
a memory selection section for selecting accessing to said data either from a low-speed access memory or a high-speed access memory;
an arithmetic operation section for performing an arithmetic operation using an address signal and an address conversion data set up by a central processing unit, to decide a converted address signal corresponding to the address signal;
a judgment section for judging whether the address signal agrees with the original address corresponding to the low-speed access memory which performed the data transfer; and
a selection section selected from the group consisting of
a first selection section in which, when the high-speed access memory is selected in the memory selection section and a judgment result in the judgment section is an agreement, the converted address signal is selected,
a second selection section in which, when the high-speed access memory is selected in the memory selection section and a judgment result in the judgment section is a disagreement, the address signal is selected, a third selection section in which, when the low-speed access memory is selected in the memory selection section and a judgment result in the judgment section is an agreement, the address signal is selected, and a fourth selection section in which, when the low-speed access memory is selected in the memory selection section and a judgment result in the judgment section is a disagreement, the address signal is selected, wherein the memory selection section is to select accessing, based on the capacity of a vacant area in the high-speed access memory, from the high-speed access memory if the capacity of said vacant area is sufficient for the data processing, and from the low-speed access memory if the capacity of said vacant area is not sufficient for the data processing, and wherein the processings in said arithmetic operation section and said judgment section are performed in parallel.

6. The data processor having address conversion according to claim 4 or 5, wherein the address signal processed in the arithmetic operation section is characterized in that the entire bits of the address data are not set, but a plurality of predetermined bits are set.

* * * * *